US012301568B2

(12) United States Patent
Demange et al.

(10) Patent No.: US 12,301,568 B2
(45) Date of Patent: *May 13, 2025

(54) METHODS AND SYSTEMS FOR EFFICIENT CONTENT DELIVERY

(71) Applicant: Viasat, Inc., Carlsbad, CA (US)

(72) Inventors: Christopher J. Demange, San Diego, CA (US); Shameem Hashmi, Carlsbad, CA (US)

(73) Assignee: Viasat, Inc., Carlsbad, CA (US)

(*) Notice: Subject to any disclaimer, the term of this patent is extended or adjusted under 35 U.S.C. 154(b) by 306 days.

This patent is subject to a terminal disclaimer.

(21) Appl. No.: 17/870,486

(22) Filed: Jul. 21, 2022

(65) Prior Publication Data

US 2023/0047593 A1 Feb. 16, 2023

Related U.S. Application Data

(63) Continuation of application No. 17/162,447, filed on Jan. 29, 2021, now Pat. No. 11,431,708, which is a
(Continued)

(51) Int. Cl.
*H04L 9/40* (2022.01)
*H04L 65/1069* (2022.01)
(Continued)

(52) U.S. Cl.
CPC ........ *H04L 63/0876* (2013.01); *H04L 63/083* (2013.01); *H04L 65/1069* (2013.01);
(Continued)

(58) Field of Classification Search
CPC ... H04L 63/0876; H04L 63/083; H04L 65/80; H04L 65/60; H04L 65/1069; G06Q 50/14; G06Q 50/30
See application file for complete search history.

(56) References Cited

U.S. PATENT DOCUMENTS 7,343,157 B1 3/2008 Mitchell
8,744,926 B1 * 6/2014 Heron ................ G06Q 30/0633
705/26.7
(Continued)

FOREIGN PATENT DOCUMENTS

WO WO2014/043402 A2 3/2014

OTHER PUBLICATIONS

CM Airlines, "Onboard Entertainment", http://www.cmairlines.com/travel-infor/on-board-entertainment, Sep. 24, 2015, 2 pgs.
(Continued)

*Primary Examiner* — Thaddeus J Plecha
(74) *Attorney, Agent, or Firm* — Holland & Hart LLP

(57) ABSTRACT

Methods and systems for improved device authentication and presentation of media content to passengers aboard a transportation apparatus are disclosed. In some aspects, authentication of a device may be simplified based on previous associations made between the device, a user, and travel on a transportation apparatus within a particular time period. In some aspects, passenger selected media content may be prepositioned on stable storage within a transportation apparatus such that the media content may be provided to one or more passengers of the transportation apparatus while the transportation apparatus is in motion, and thus avoid transfer of the media content over an off-board wireless communication link.

20 Claims, 11 Drawing Sheets

Related U.S. Application Data continuation of application No. 15/682,969, filed on Aug. 22, 2017, now Pat. No. 10,938,810.

(60) Provisional application No. 62/378,108, filed on Aug. 22, 2016.

(51) Int. Cl.
| | |
|---|---|
| *H04L 65/60* | (2022.01) |
| *H04L 65/612* | (2022.01) |
| *H04L 65/80* | (2022.01) |
| *H04L 67/12* | (2022.01) |
| *H04L 67/568* | (2022.01) |
| *G06Q 50/14* | (2012.01) |
| *G06Q 50/40* | (2024.01) |
| *H04W 12/06* | (2021.01) |

(52) U.S. Cl.
CPC ............ *H04L 65/60* (2013.01); *H04L 65/612* (2022.05); *H04L 65/80* (2013.01); *H04L 67/12* (2013.01); *H04L 67/568* (2022.05); *G06Q 50/14* (2013.01); *G06Q 50/40* (2024.01); *H04W 12/06* (2013.01)

(56) References Cited

U.S. PATENT DOCUMENTS

| | | |
|---|---|---|
| 8,763,047 B2 | 6/2014 | Sterkel et al. |
| 8,806,543 B1 | 8/2014 | Curtis et al. |
| 8,997,159 B2 | 3/2015 | Ogilvie |
| 9,003,454 B2 | 4/2015 | Keen et al. |
| 9,648,088 B1 | 5/2017 | Pande et al. |
| 10,595,052 B1 | 3/2020 | Worley |
| 11,431,708 B2 * | 8/2022 | Demange .............. H04L 63/083 |
| 2003/0046118 A1 | 3/2003 | O'Donnell |
| 2005/0289629 A1 | 12/2005 | Nadarajah |
| 2006/0085308 A1 | 4/2006 | Metzger |
| 2008/0273591 A1 | 11/2008 | Brooks et al. |
| 2009/0288123 A1 | 11/2009 | Havlovick et al. |
| 2011/0046987 A1 | 2/2011 | Petrisor |
| 2011/0313826 A1 | 2/2011 | Keen et al. |
| 2012/0009951 A1 | 1/2012 | Poland |
| 2012/0284756 A1 | 11/2012 | Kotecha |
| 2014/0032627 A1 | 1/2014 | Lorenz et al. |
| 2014/0039733 A1 | 2/2014 | Ren et al. |
| 2014/0282765 A1 | 9/2014 | Casey et al. |
| 2014/0368734 A1 | 12/2014 | Hoffert |
| 2015/0043561 A1 * | 2/2015 | Xia ....................... H04W 12/06 |
| | | 370/338 |
| 2015/0095073 A1 | 4/2015 | Li |
| 2015/0134754 A1 | 5/2015 | Lauer et al. |
| 2016/0066004 A1 | 3/2016 | Lieu et al. |
| 2017/0187822 A1 | 6/2017 | Thomee |
| 2017/0228787 A1 * | 8/2017 | Oyaga ................ G06Q 30/0264 |
| 2017/0345459 A1 | 11/2017 | Manville et al. |
| 2018/0048691 A1 | 2/2018 | Pruden et al. |
| 2018/0084250 A1 | 3/2018 | Adzic |
| 2018/0176265 A1 | 6/2018 | Le Rouzic |

OTHER PUBLICATIONS

Infosys, "Ace—Aviation CX (Customer Experience) Enhancer: Infoxsys Offering for the Airline Industry", http://www.infosys.com/offerings/Documents/aviation-cx-enhancer.pdf, 2003, 2 pgs.
Jetstar, "Jetstar—Entertainment", http:.www.jetstar.com/us/en/what-we-offer/in-flight/entertainment, Sep. 24, 2015, 1 pg.

* cited by examiner

METHODS AND SYSTEMS FOR EFFICIENT CONTENT DELIVERY

CROSS-REFERENCE TO RELATED APPLICATIONS

The present application for Patent is a continuation of U.S. patent application Ser. No. 17/162,447 entitled "Methods and Systems For Efficient Content Delivery" filed Jan. 29, 2021, which is a continuation of U.S. patent application Ser. No. 15/682,969 entitled "Methods and Systems for Efficient Content Delivery" filed Aug. 22, 2017, which claims priority to U.S. Provisional Application No. 62/378,108, titled "Methods and Systems for Efficient Content Delivery", filed Aug. 22, 2016, each of which are expressly incorporated by reference herein for any and all purposes.

BACKGROUND

Embodiments relate generally to communications systems, and, more particularly to efficient media content delivery over wireless access networks.

BRIEF SUMMARY

As discussed in the description that follows, a transportation apparatus may be equipped with a media delivery system. The media delivery system may be configured to provide media content items (e.g., movies, television shows, music, etc.) to passengers during travel on the apparatus. The media delivery system may for example store pre-positioned or preloaded media content items that were selected by the passengers prior to the travel, such as during one or more of the ticket buying process, check in, a certain time prior to boarding, etc. Permitting individual selection of media content items prior to travel can improve the passenger experience, by increasing the likelihood they will consume content of interest to them. If not already stored on the transportation apparatus, an off-board media distribution system may attempt to preload the selected media items in advance of the travel by the passenger on the transportation apparatus. In cases in which a selected media content item has been successfully preloaded or is already stored on the transportation apparatus, it can be locally delivered in response to a request by the passenger during the travel without having to use an off-board wireless communication link to the apparatus, such as a satellite or other wireless networking connection. In cases in which the selected media content item has not been preloaded, a request during the travel may be fulfilled by retrieving the media content item over the off-board wireless communication link. The preloading of the selected media content items may be done some time prior to the travel of the particular passenger, when the wireless communication link includes excess capacity above its current bandwidth demands. In this way, a preloaded media content item can be provided for consumption without relying on receiving it in real time over the wireless communication link, which may be difficult (e.g., technically challenging, resource intensive, etc.) if the wireless communication link is heavily loaded at that time. In doing so, the techniques described herein permit resources of the wireless communication like to be used more effectively and efficiently, as compared to real time use of the wireless communication link for all requested content items. Furthermore, by also permitting retrieval of a requested media content item that has not been preloaded over the wireless communication link, the passenger is not limited to only locally stored content. This can improve the passenger experience by increasing the likelihood they will consume content of interest, even if the passenger did not preselect content and/or has decided to consume other content during the travel.

Furthermore, some of the methods and systems disclosed provide for improved authentication of user devices during travel on a transportation apparatus. For example, the methods and systems may enable a user to establish an association between themselves (via a registered user account) and an electronic device they plan to use to access media content items while traveling on a transportation apparatus. Additionally, the methods and systems may enable the user to establish an association between the user and one or more travel events. For example, the user may be able to buy a ticket for travel from a particular origin point to a particular destination. There may be a particular transportation apparatus that is assigned or will be assigned to this travel. Therefore, an association may be generated between the user and the particular transportation apparatus, with the association valid for at least a period of time associated with the travel. Because the user is associated with the travel and with the device, a request for access for wireless communication services during the travel on-board the transportation apparatus may be facilitated by use of these associations. For example, in some aspects, if a device is associated with a user traveling on a particular travel apparatus, it may be possible to authenticate the device without requiring the user to enter a registered user name and/or a password for that registered user, before the user may begin utilizing wireless communication services on the transportation apparatus. This may facilitate ease of use for the user on the transportation apparatus during the travel. For example, when the user books a ticket on an airline flight and associates their smartphone with a particular registered user name and also books an airline flight using the registered user name, the user may be able to walk aboard an airplane for the airline flight and be immediately connected to a wireless network, without any need to provide the registered user name or a password before the connection to the wireless network occurs.

BRIEF DESCRIPTION OF THE DRAWINGS

The present disclosure is described in conjunction with the figures.

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different networking technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
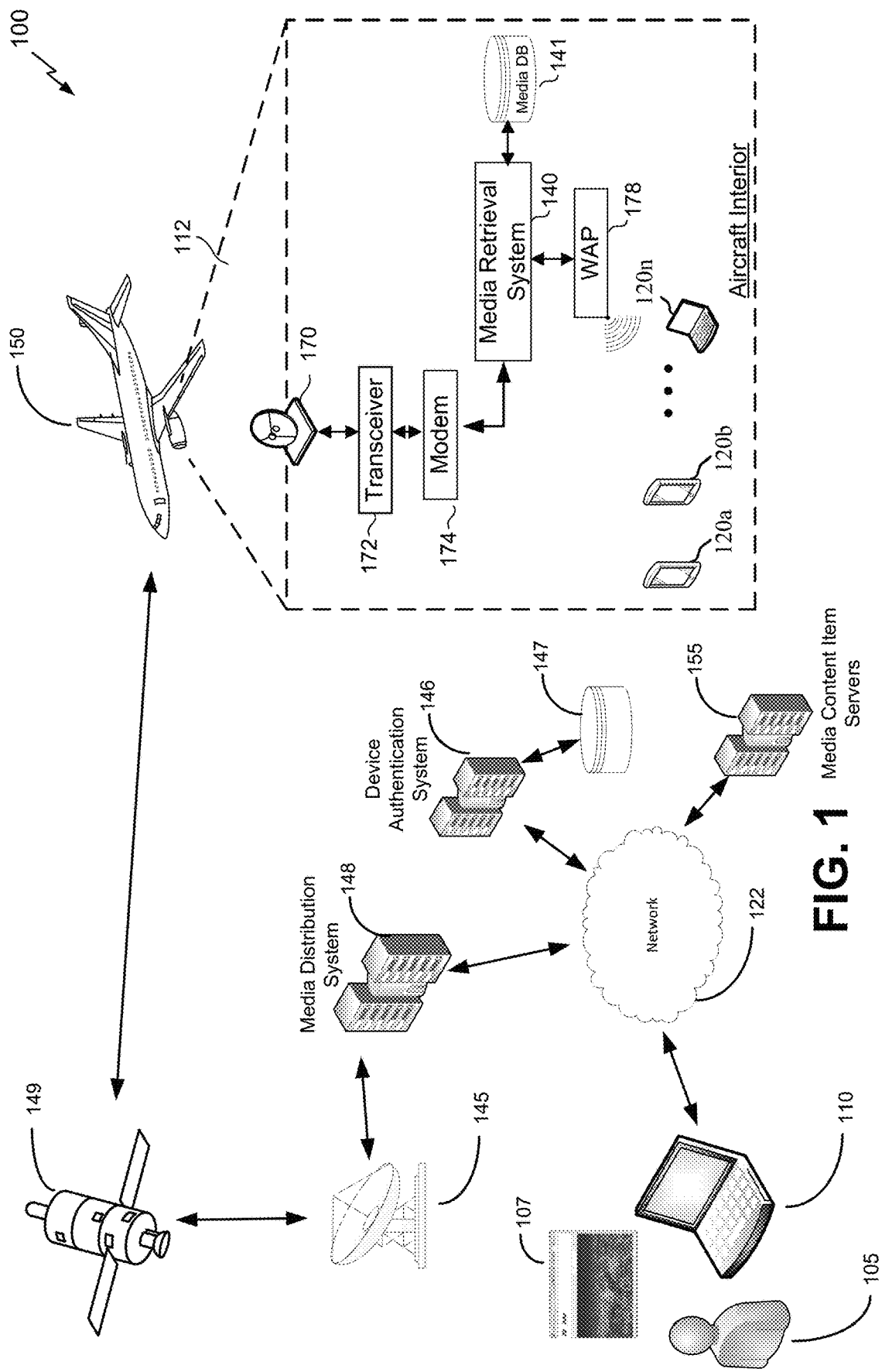
FIG. 1 shows a simplified diagram of a communications system 100, which provides a context for various embodiments.

FIG. 1 shows a simplified diagram of a communications system 100, which provides a context for various embodiments. FIG. 1 includes a user 105 that may be interacting with an electronic device 110. While the electronic device 110 is shown as a laptop computer in FIG. 1, in some aspects the electronic device 110 may have other form factors, such as a desktop computer, tablet, or mobile device. The user's electronic device 110 is in communication with one or more of a device authentication system 146 and a media distribution system 148 via a network 122. In some aspects, the network 122 may include the Internet. Each of the device authentication system 146 and the media distribution system 148 may include one or more computers, such as server computers, in network communication with each other and with the electronic device 110. While each of the device authentication system 146 and the media distribution system 148 are shown in FIG. 1 as single entities in one physical location, in some aspects, one or more of the device authentication system 146 and the media distribution system 148 may themselves be virtualized, such that components within the device authentication system 146 and/or the media distribution system 148 are geographically distributed, with the geographically distributed components connected via a communications network.

The device authentication system 146 may provide device authentication services for user devices, such as the device 110 using device authentication database 147 (stable storage). The media distribution system 148 may be in communication with one or more media content item servers 155 (also referred to herein as "remote media server(s)"). The media content item servers 155 may store a plurality of media content items accessible to electronic devices during travel on the transportation apparatus 150. The media content item servers 155 are located off-board the transportation apparatus 150, in that they are not physically within the transportation apparatus 150 and a transfer of data between the media content item servers 155 and the transportation apparatus 150 may be performed by a wide area network via a wireless communication link, such as that provided by a satellite 149 or other type of access network such as an air-to-ground network.

The media distribution system 148 may also be in networked communication with a transportation apparatus 150, shown in FIG. 1 as an aircraft. In some aspects, the transportation apparatus 150 may be in other forms, such as a vehicle, ship, train, or other means of transporting people. The network communication between the media distribution system 148 and the transportation apparatus 150 may, in some aspects, be provided via satellite 149 or other type of wireless communication network.

The transport apparatus 150 can include a two-way communication system 112 (also referred to herein as a "media delivery system") to facilitate bidirectional communication with the satellite 149 via the wireless communication link. In the illustrated embodiment, the two-way communication system 112 includes a network access terminal to provide network access to in-transport electronic devices 120a-n via the wireless communication link with the satellite 149 (or other type of access network). In the illustrated embodiment, the network access terminal includes an antenna system 170, transceiver 172, and a modem 174. The two-way communication system 112 further includes a media retrieval system 140, a media database 141 (stable storage), and a wireless access point (WAP) 176 to communicate with one or more in-transport electronic devices 120a-n. In aspects that provide transportation apparatus 150 with two or more access networks, or more than one access network of different types that require particularly specialized hardware to communicate over said available access networks, then other contemplated embodiments may include two, three, four, five, six, seven, eight, nine, or ten antennas, transceivers, modems as necessarily to facilitate communication over the available access networks or available access network types.

The network access terminal installed in the transport apparatus 150 can provide for reception of a forward downlink signal from the satellite based access network including the satellite 149 and gateway 145 a and transmission of a return uplink signal to the satellite based access network using the satellite 149 and the gateway 145, to support two-way data communications between the in-transport electronic devices 120*a-n* within the transport apparatus 150 and the terrestrial network 122. The network access terminal also may provide connectivity between the media retrieval system 140 and the media distribution system 148 via the satellite 149 and gateway 145. The in-transport electronic devices 120*a-n* can include mobile devices (e.g., smartphones, laptops, tablets, netbooks, and the like) such as personal electronic devices (PEDs) brought onto the transportation apparatus 150 by passengers. As further examples, the in-transport electronic devices 120*a-n* can include passenger seat back systems or other devices on the transportation apparatus 150. The in-transport electronic devices 120*a-n* can communicate with the media retrieval system 140 via a communication link that can be wired and/or wireless. The communication link can be, for example, part of a local area network such as a wireless local area network (WLAN) supported by the wireless access point (WAP) 178. One or more WAPs 178 can be distributed about the transport apparatus 150, and can, in conjunction with a media retrieval system 140, provide traffic switching and routing functionality; for example, as part of a WLAN extended service set (ESS), etc.

In the disclosed methods and systems, the user 105 may log in to an application 107 that manages aspects of travel the user 105 may undertake on the transportation apparatus 150. The application 107 may be provided to the electronic device 110 by one or more of the device authentication system 146 and the media distribution system 148. In some aspects, the application 107 may be a web based application, with a user interface displayed on the electronic device 110 and provided in a web browser application running on the electronic device 110. In these aspects, data to support the web browser application 107 may be provided by one or more of the device authentication system 146 and the media distribution system 148. In some other aspects, the application 107 may include specialized software, such as application software, installed on the electronic device 110. For example, in some aspects, the electronic device 110 may be a mobile device, with a mobile application installed on the electronic device 110 to provide the user 105 with access to the application 107.

The application 107 may include a number of features, including one or more of an ability to make a reservation for travel on the transportation apparatus 150, purchase a ticket for same, and obtain status information regarding travel on the transportation apparatus 150. In some aspects, the application 107 may enable the user 105 to associate their electronic device 110 with account credentials the user 105 may have utilized to authentication or "login" to the application 107, such as a registered user name and/or password. The application 107 may also enable the user 105 to select one or more digital communication services for use during travel on the transportation apparatus 150, such as selection of media content items as described below. For example, the application may provide an ability for the user 105 to select one or more movies or other media content items (such as streaming music, pod casts, "TV" shows, short videos such as those available on youtube.com, and the like) for access during travel on the transportation apparatus 150.

In response to selection of one or more media content items by the user 105, in some aspects, the media distribution system 148 may arrange to transfer data supporting the one or more selected media content items to the transportation apparatus 150 in advance of travel by the user 105 on the transportation apparatus 150. By transferring data to the transportation apparatus 150 in advance of the travel, the selected media content item may be provided to the user 105 during the travel on the transportation apparatus 150 more effectively than if the streaming media is provided to the transportation apparatus 150 in real time while the user is traveling on the transportation apparatus 150. For example, in some aspects, the selected media content items(s) are provided in advance, when the wireless communication link includes excess capacity above its current bandwidth demands. In some aspects, the data may be transferred during non-peak time periods, or at a time when media distribution system 148 may utilize less expensive networking resources to communicate with the transportation apparatus 150. For example, in some aspects, the advanced data transfer of the selected media content items may utilize a "trickle" transfer process, that transfers data only when capacity is available after all other traffic has been transmitted. In such a case, the advanced data transfer of the selected media content items may be a lower priority than other traffic delivered via the wireless communication link. In contrast, the real time delivery of requested media content items via the wireless communication link may be at a higher priority than the advanced data transfer, such as being the same priority as the other traffic delivered via the wireless communication link.

In some aspects, the data may be transferred a predetermined period of time prior to the travel by the user 105. In other words, in some aspects the media distribution system 148 does not necessarily immediately initiate the transfer of the selected media content item(s) to the transportation apparatus upon selection by the user. Rather, the media distribution system 148 may schedule the transfer for a time that is closer to the beginning of the travel on the transportation apparatus by the user 105.

Figure 2:
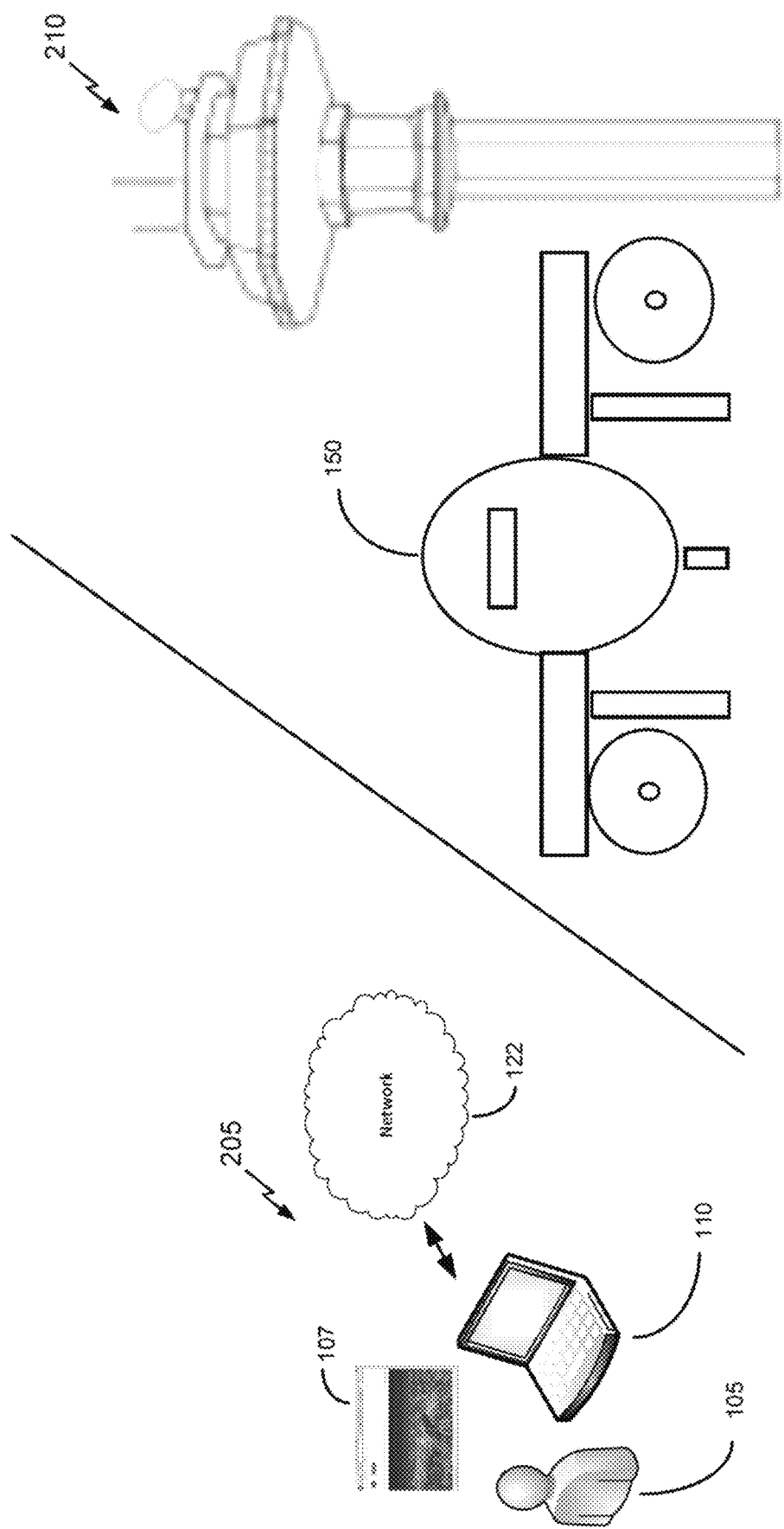
FIG. 2 illustrates an exemplary operating environment including a user environment and an airport environment.
Figure 3:
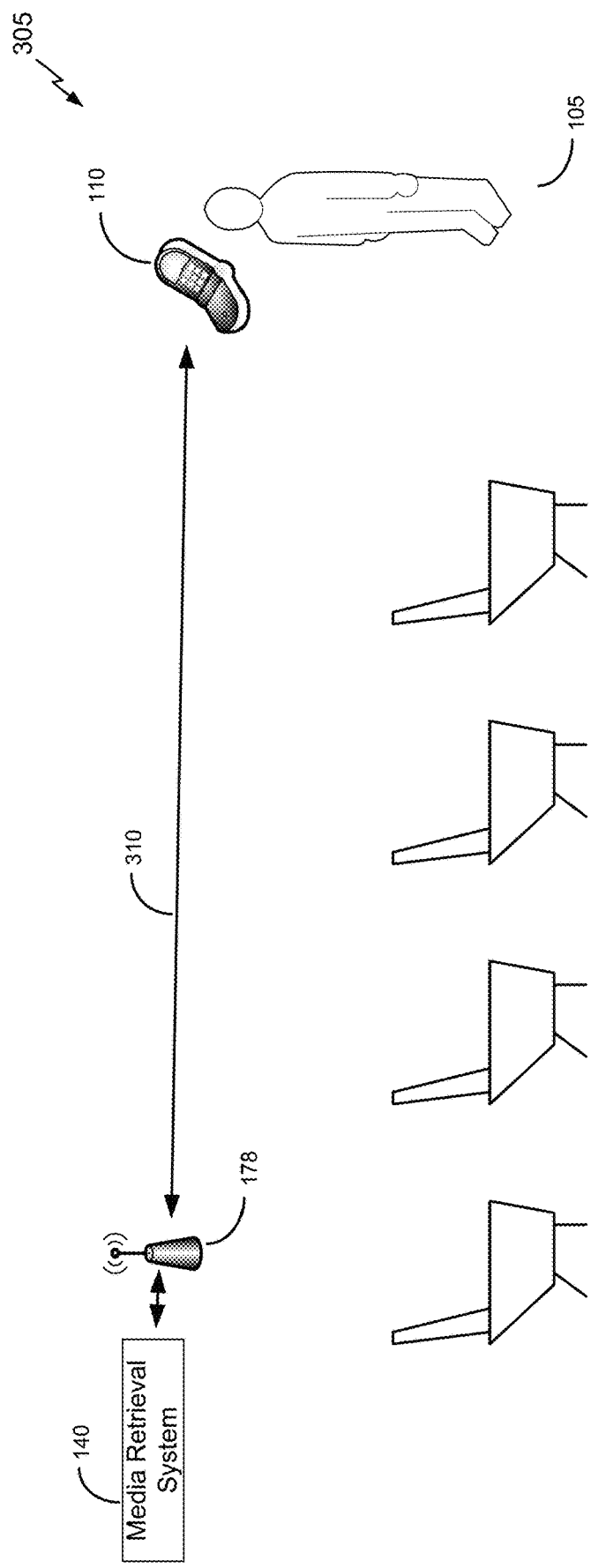
FIG. 3 shows an exemplary environment 30 on board the transportation apparatus 150 after the user 105 has entered the aircraft cabin.
Figure 4:
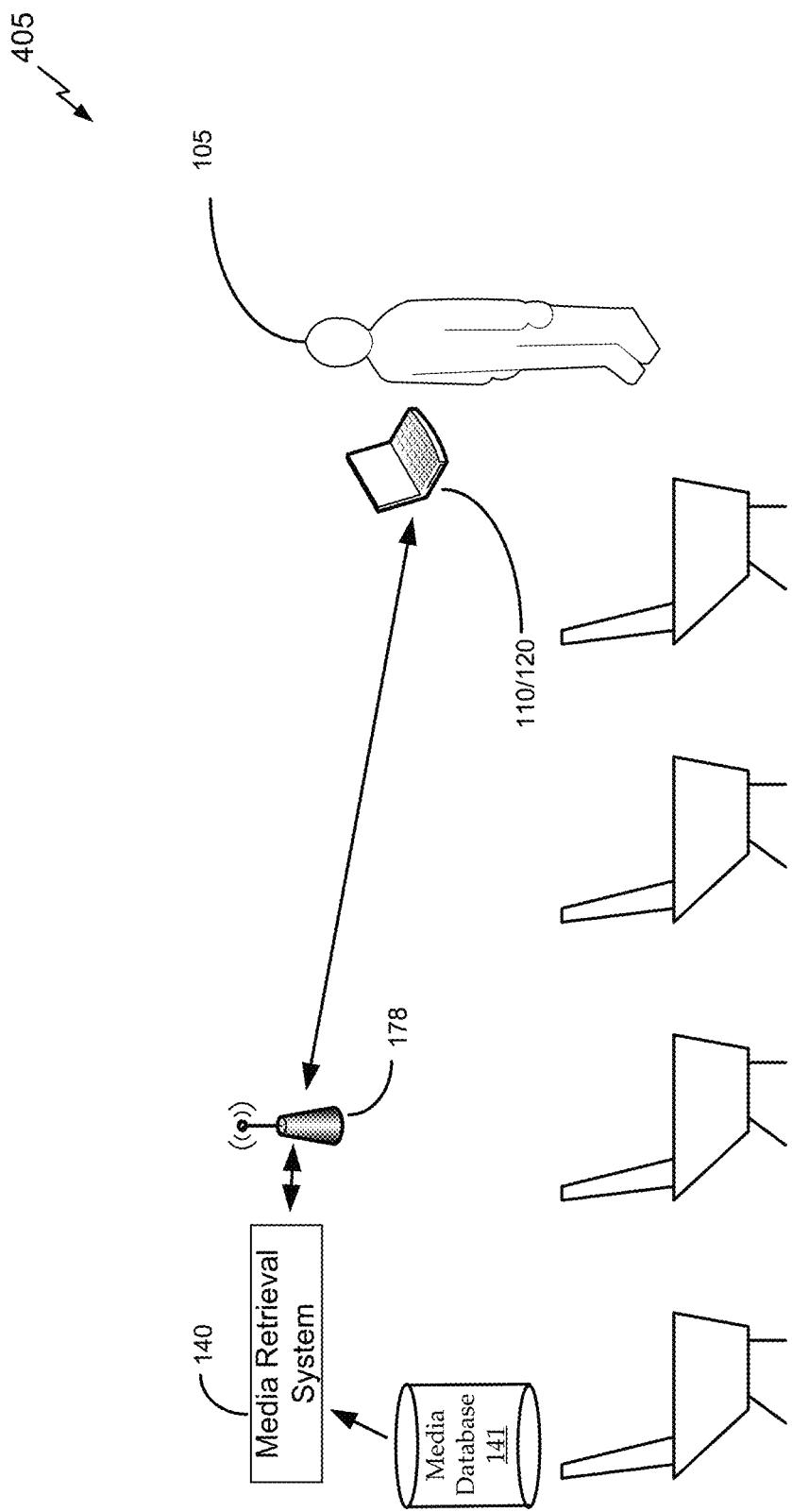
FIG. 4 shows an environment after the user has established wireless communication on board the transportation apparatus.

FIGS. 2-4 illustrate a time sequence of events that may occur using the disclosed methods and systems. FIG. 2 illustrates an exemplary operating environment including a user environment 205 and an airport environment 210. The user 105 may be interacting with the application 107 discussed above with respect to FIG. 7 using the electronic device 110 within the environment 205. The environment 205 may be physically distant from the airport environment 210, which may include the transportation apparatus 150 from FIG. 1. For example, the user 105 may be interacting with the application 107, without any involvement of the transportation apparatus 150 or airport environment 210 generally. For example, while the user is interacting with the application 107 in the environment 205, the transportation apparatus 150 may be parked at a loading gate of an airport or participating in travel unrelated to travel associated with the user 105.

Via interaction with the application 107, the user may schedule travel on the transportation apparatus 150, indicate an association between the user 105 and the electronic device 110 to the application 107, check status of the travel on the transportation apparatus 150, and/or select one or more media content items for access during future travel on the transportation apparatus 150.

FIG. 3 shows an exemplary environment 305 on board the transportation apparatus 150 after the user 105 has entered the aircraft cabin. The environment 305 may occur after the user 105 has provided one or more associations between the user 105 and their electronic device 110 via the application 107, and purchased, via the application 107, a ticket for travel on the transportation apparatus 150. The user 105 may have also selected one or more media content items via the application 107 for access during travel on the transportation apparatus 150 before boarding the transportation apparatus 150 as represented by the environment 305. As the user enters the transportation apparatus 150 in environment 305, their electronic device 110 becomes equivalent to the client devices 120*a-n* discussed above with respect to FIG. 1.

The environment 305 includes the wireless access point 178 (or other local area network connection) discussed above with respect to FIG. 1. Sometime after entering the transportation apparatus 150, the user's electronic device 110 may request access to a wireless network via the wireless access point 178. In response, the wireless access point 178 may communicate with the media retrieval system 140 to determine whether to or how to authorize access for the electronic device 110. The communication 310 may include a request from the electronic device 110 to the media retrieval system 140 for access to a wireless communication system within the transportation apparatus 150. The request may include an identifier of the electronic device 110, such as a station or media access control address. In response, the media retrieval system 140 may determine whether the electronic device 110 is associated with a known user. For example, known users may be users registered within a user database, such as the user registration database 850 discussed below with respect to FIG. 8, and/or the device authentication database 147.

If an association is found between the identifier of the electronic device 110 and a registered user, the media retrieval system 146 may then determine if there is an association between the registered user and the transportation apparatus 150, and in particular whether there is an association for the time period represented by the environment 305. In other words, the media retrieval system may, in addition to identifying the user based on a device identifier of their electronic device 110, also determine whether that user is booked for travel on the transportation apparatus 150 when the user is physically within the transportation apparatus 150, and requesting access to a wireless communication network provided by the wireless access point 178 and media retrieval system 146. This association may be identified via the device authentication database 147, including the device association table 806, transportation apparatus table 808, and travel table 810, discussed below with respect to FIG. 8.

If the user is associated with the transportation apparatus during the time they are within the transportation apparatus 150, then the communication 310 may include a response to the electronic device granting access to the wireless communication service. If no proper association(s) are identified, prompts may be generated on a user interface of the electronic device 110 requesting authentication credentials be entered to establish access (such as a registered user name and password). Alternatively, the requested access may be denied in some aspects if no proper associations are found.

By associating a registered user with the electronic device 110 prior to the user 105 boarding the transportation apparatus 150 for travel, ease of use may be improved for the user 105 while on board the transportation apparatus 150. For example, in order to access wireless communication services available via the wireless access point 178, there may be no need for a user to enter authentication information (such as a registered user name and password) prior to the media retrieval system 146 granting access to the user 105 for wireless communication services.

FIG. 4 shows an environment 405 after the user has established wireless communication on board the transportation apparatus 150. Because the user had previously selected one or more media content items for access during travel on the transportation apparatus 150, these selected items may be included in the on-board media database 141, discussed above with respect to FIG. 1. As these items are local to the transportation apparatus 150 during the travel depicted in FIG. 4, the off-board wireless communication link with the satellite (or other access network) may be used more efficiently, as compared to only relying on off-board retrieval of media content items, such as those provided by the media content item servers 155 shown in FIG. 1. Additionally, the overhead associated with providing the media content items to the user 105 may be reduced under the model shown in FIG. 4. For example, by prepopulating the media database 141 with selected media content items before the travel depicted in FIG. 4, delivery of the requested media content items may be performed more cost effectively than if the media content items are retrieved for the user 105 from the media content item servers 155 in real time during the travel depicted in FIG. 4. For example, in some aspects, the media database 141 may be prepopulated using lower priority data transfer mechanisms than those that can be utilized when the media content items are retrieved from the media content item servers 155 during the travel depicted in FIG. 4. In cases in which a requested media content item has not been preloaded in the media database 141, the media retrieval system 140 can retrieve it from the media content item servers 155 via the off-board wireless communication link. In doing so, passengers are not limited to only locally stored content. This can improve the passenger experience by increasing the likelihood they will consume content of interest, even if the passenger did not preselect content and/or has decided to consume other content during the travel.

Figure 5:
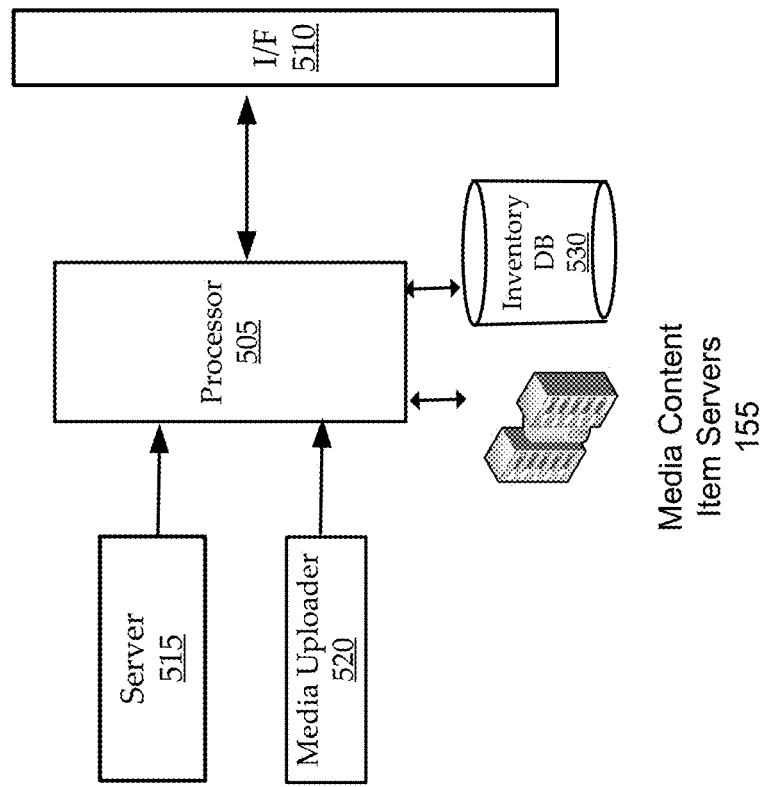
FIG. 5 is a block diagram of the media distribution system of FIG. 1.

FIG. 5 is a block diagram of the media distribution system 148 of FIG. 1. Many other configurations of the media distribution system 148 are possible having more or fewer components. Moreover, the functionalities described herein can be distributed among the components in a different manner than described herein.

The media distribution system 148 includes an electronic hardware processor 505, network interface 510, a web server 515, and a media uploader 520. The media distribution system 148 may also be in communication with the media content item servers 155, discussed above with respect to FIG. 1, and an inventory database 530 (stable storage). The inventory database 530 may be used to track which media content items are present on stable storage within a transportation apparatus, and is discussed in more detail below, for example, with respect to FIG. 8. As used herein, "stable storage" may be, for example, a solid-state storage device (e.g., a solid state drive (SSD), flash memory, etc.) or any other type of non-volatile storage media (e.g., hard disk drive (HDD), etc.). The electronic hardware processor 505 may be in communication with the network interface 510 via an electronic bus (not shown). The processor 505 may communicate with the network interface 510 to transmit and/or receive packets over a network, such as a network providing connectivity to the wireless access point 178 and/or modem 174 discussed above with respect to FIG. 1.

The server 515 and media uploader 520 may be portions of a volatile or stable storage, such as a virtual or physical memory space accessible to processor 505. The server 515 and media uploader 520 may include binary data defining instructions that configure the processor 205 to perform various functions. For example, the server 515 may include instructions that configure the processor 505 to provide a web interface to a browser running on the user 105's electronic device 110 to provide application functionality to the user 105. For example, as discussed above, the server 515 may provide interfaces that enable the user 105 to book a ticket on the transportation apparatus 150, review schedules or status of a trip on the transportation apparatus 150. The server 215 may also provide interfaces to allow the user 105 to request particular media content for accessing during travel on the transportation apparatus 150. In some aspects, an application may be installed on the user's electronic device 110 such that the server 515 does not need to provide interfaces per se to the electronic device 110. In these aspects, the web server 110 may provide data supporting functions provided by the software application installed on the electronic device 110.

The media uploader 520 may include instructions that configure the processor 505 to transfer media data selected via the interfaces supported by the web server 510, by the user 105 to the transportation apparatus 150 before travel by the user 105 on the transportation apparatus is initiated. In some aspects, this data transfer may be accomplished using file transfer protocol (FTP), or hypertext transfer protocol (HTTP) in some aspects. The media uploader 520 may include instructions that configure the processor 505 to obtain media data from the media content item servers 155, and transmit the data over the network interface 510 to, for example, the media retrieval system 140 discussed above with respect to FIG. 1.

Figure 6:
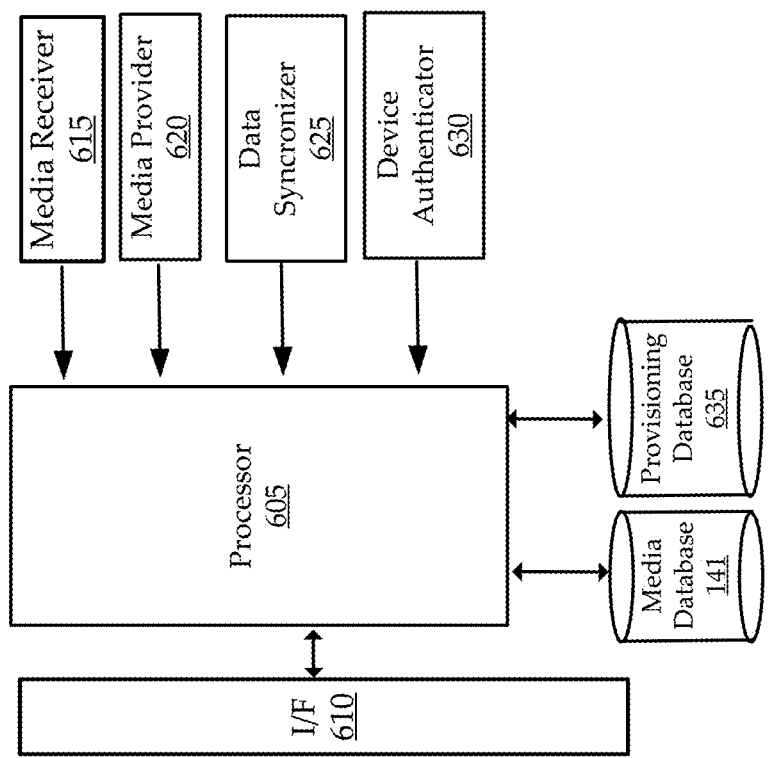
FIG. 6 is a block diagram of the media retrieval system of FIG. 1.

FIG. 6 is a block diagram of the media retrieval system 140 of FIG. 1. Many other configurations of the media retrieval system 140 are possible having more or fewer components.

The illustrated exemplary media retrieval system 140 includes an electronic hardware processor 605, network interface 610, a media receiver 615, a media provider 620, a data synchronizer 625, a media database 630, and a provisioning database 635 (stable storage). The processor 605 may be in communication with the network interface 610 via an electronic bus (not shown). The processor 605 may communicate with the network interface 610 to transmit and/or receive packets over a network, such as a network providing connectivity to the media distribution system 148, discussed above with respect to FIG. 5.

The media receiver 615, media provider 620, and data synchronizer 625 may be portions of a volatile or stable storage, such as a virtual or physical memory space accessible to processor 605. The media receiver 615, media provider 620, and data synchronizer 625 and device authenticator 630 may include binary data defining instructions that configure the processor 605 to perform various functions. For example, the media receiver 615 may include instructions that configure the processor 605 to receive media data from the media distribution system 148 and store the media data in the media database 625. The media provider 620 may include instructions that configure the processor 605 to provide media content items from the media database 625 if available to the personal electronic devices 120a-n as requested, or alternatively, if the requested media content item is not available, the media provider 620 may configure the processor 605 to request the media data from media content item servers 155 accessible via the two way communications system 112. For example, the media data may be requested from the media content item servers 155 accessible via network 122 of FIG. 1.

The data synchronizer 625 may include instructions that configure the processor 605 to synchronize, for example, periodically, at least a portion of data in the device authentication database 147 with data in the provisioning database 635. For example, data indicating an association between a device identifier, such as a station address, with a user, may be synchronized between the device authentication database 147 and the provisioning database 635. Additionally, associations between users and transportation apparatus during particular time periods may also be synchronized between the device authentication database 147 and the provisioning database 635.

The device authenticator 630 may include instructions that configure the processor 605 to authenticate a device requesting access to a wireless network installed on a transportation apparatus.

Figure 7:
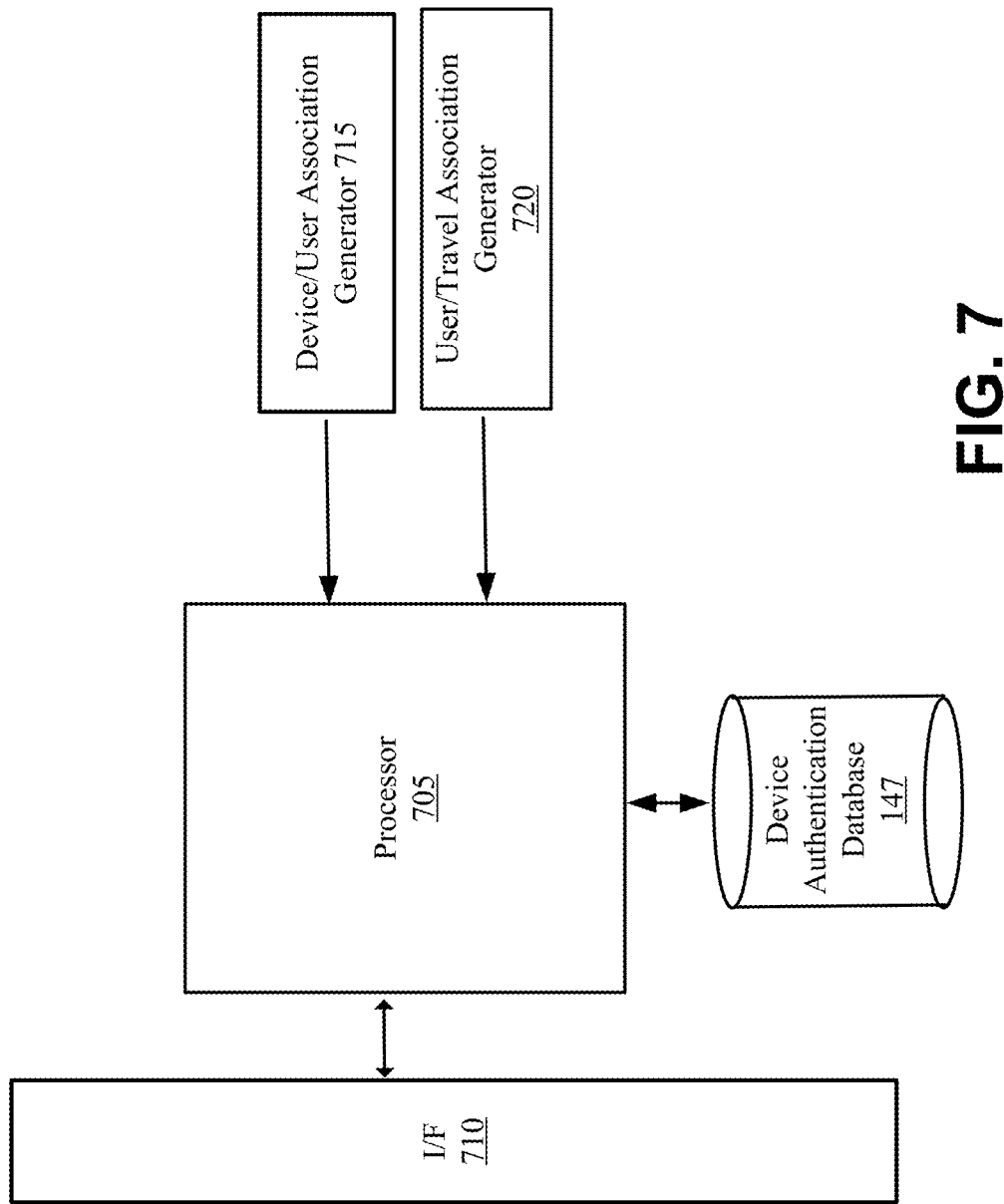
FIG. 7 is a block diagram of the device authentication system of FIG. 1.

FIG. 7 is a block diagram of the device authentication system 146 of FIG. 1. Many other configurations of the device authentication system 146 are possible having more or fewer components. Moreover, the functionalities described herein can be distributed among the components in a different manner than described herein.

The device authentication system 146 includes an electronic hardware processor 705, network interface 710, a device/user association generator 715 and a user/travel association generator 720. The device authentication database 147 discussed above with respect to FIG. 1 is also shown in FIG. 7. The processor 705 may be in communication with the network interface 710 via an electronic bus (not shown). The processor 705 may communicate with the network interface 710 to transmit and/or receive packets over a network, such as a network providing connectivity to the electronic device 110, discussed above with respect to FIG. 1.

The device/user association generator 715 and the user/travel association generator 720 may be portions of a volatile or stable storage, such as a virtual or physical memory space accessible to processor 705. The user association generator 715 and the user/travel association generator 720 may include binary data defining instructions that configure the processor 705 to perform various functions. For example, the device/user association generator 715 may configure the processor 705 to store associations between a device identifier of the electronic device 110 and the user 105. Such an association may include the device identifier, such as a media access control (MAC) or station address, a user name associated with the user 105, and a password for an account identified by the user name.

The user/travel association generator 720 may include instructions that configure the processor 705 to store associations between a user and a transportation apparatus during a particular time period. For example, if the user is traveling on an airline flight utilizing a particular airplane, the user/travel association generator 720 may generate an association between the user and the particular airplane. The association may also include a time period encompassing a scheduled time for the airline flight.

Figure 8:
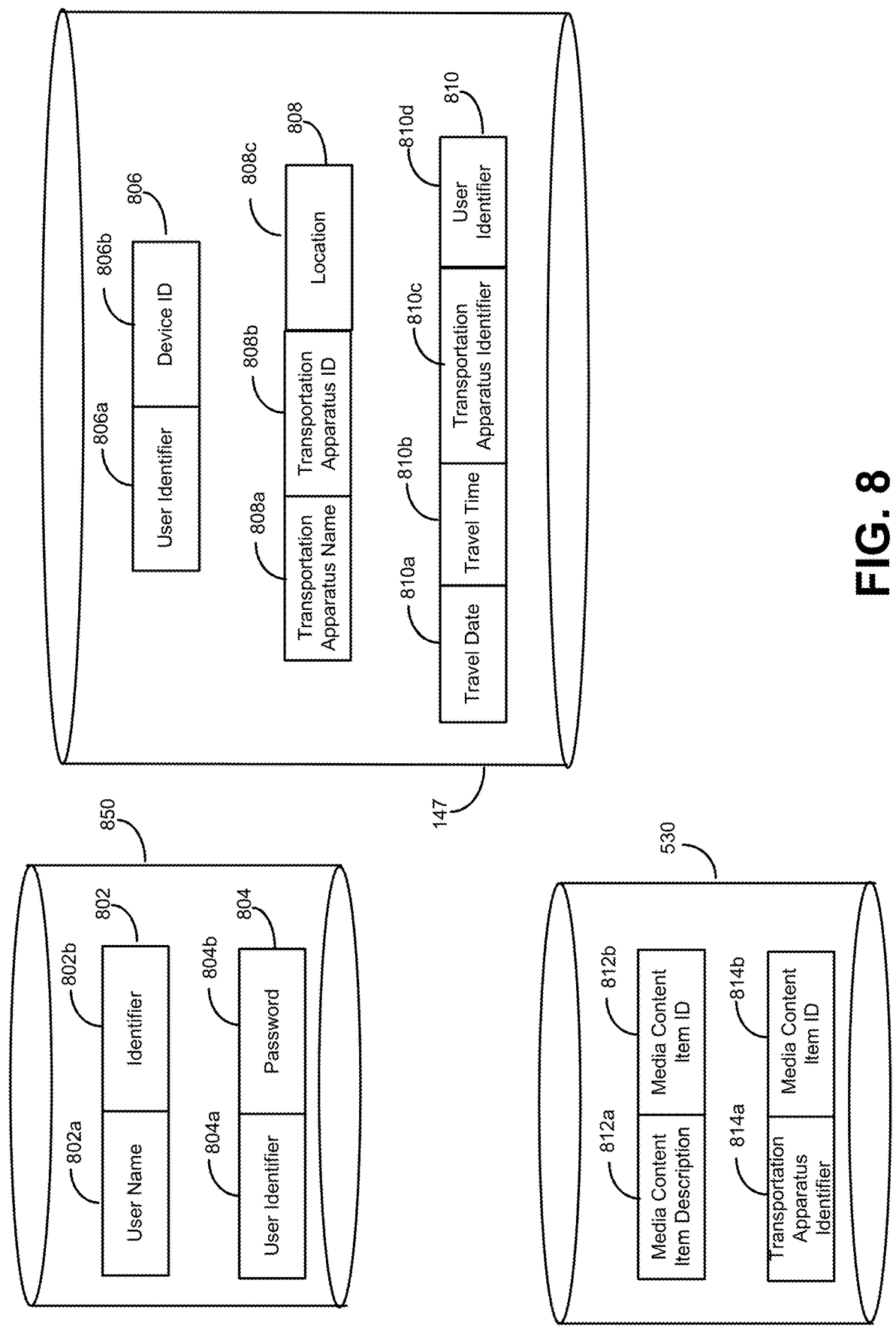
FIG. 8 shows an exemplary structure of a device authentication database, inventory database, and user registration database.

FIG. 8 is a diagram showing exemplary structures of three databases, a user registration database 850, a device authentication database 147, and an inventory database 530. The user registration database includes a table 802 including a registered user name 802a and a user identifier 802b. The user registration database 850 also includes a password table 804 including a user identifier 804a and a password 804b. The value of the user identifier field 804a may correspond to a value provided in the registered user name table 802. The user registration database 850 may be used to establish a session with a user.

The device authentication database 147 includes a device association table 806 including a user identifier field 806a and a device id field 806b. In some aspects, the device association table 806 may be used to generate an association between a user, identified by the user identifier field 806a, and a device, identified by the device id 806b. For example, in some aspects, the user identifier field 806a may store a user identifier for the user 105, and the device id field 806b may store a station address for the electronic device 110.

The device authentication database 147 also includes a transportation apparatus table 808, including a transportation apparatus name field 808a, a transportation apparatus id field 808b, and a transportation apparatus location field 808c. The transportation apparatus table 808 may be utilized to facilitate identification and tracking of transportation apparatus, such as the transportation apparatus 150, discussed above. The database 147 also includes a travel table 810, including a travel date field 810a, a travel time field 810b, a transportation apparatus identifier 810c, and a user identifier 810d. The travel table 810 may form an association between a device, user, and transportation apparatus. For example, a particular row of the travel table 810 may represent a passenger ticket for travel, identifying the passenger via the user identifier field 810d, and identifying the transportation apparatus to be used for the travel via field 810c. The device may be associated with the travel via the device table 806, by matching the user id fields 810d and 806a.

FIG. 8 also shows an exemplary format for an inventory database table 530. The inventory database 530 may be utilized by the disclosed embodiments to determine which media content items are available for selection by a user, and which media content items are stored on a particular transportation apparatus. The inventory database 530 includes a media content item table 812, which includes a description field 812a and an item ID field 812b. The inventory database 530 also includes a transportation inventory table 814. Each row of the transportation apparatus inventory table 814 includes a transportation apparatus identifier 814a and a item id field 814b. If a particular media content item is present on a particular transportation apparatus, a row indicating the identifier of the particular transportation apparatus in field 814a and the identifier of the media content item in field 814b will be present in the transportation apparatus inventory table 814.

Figure 9:
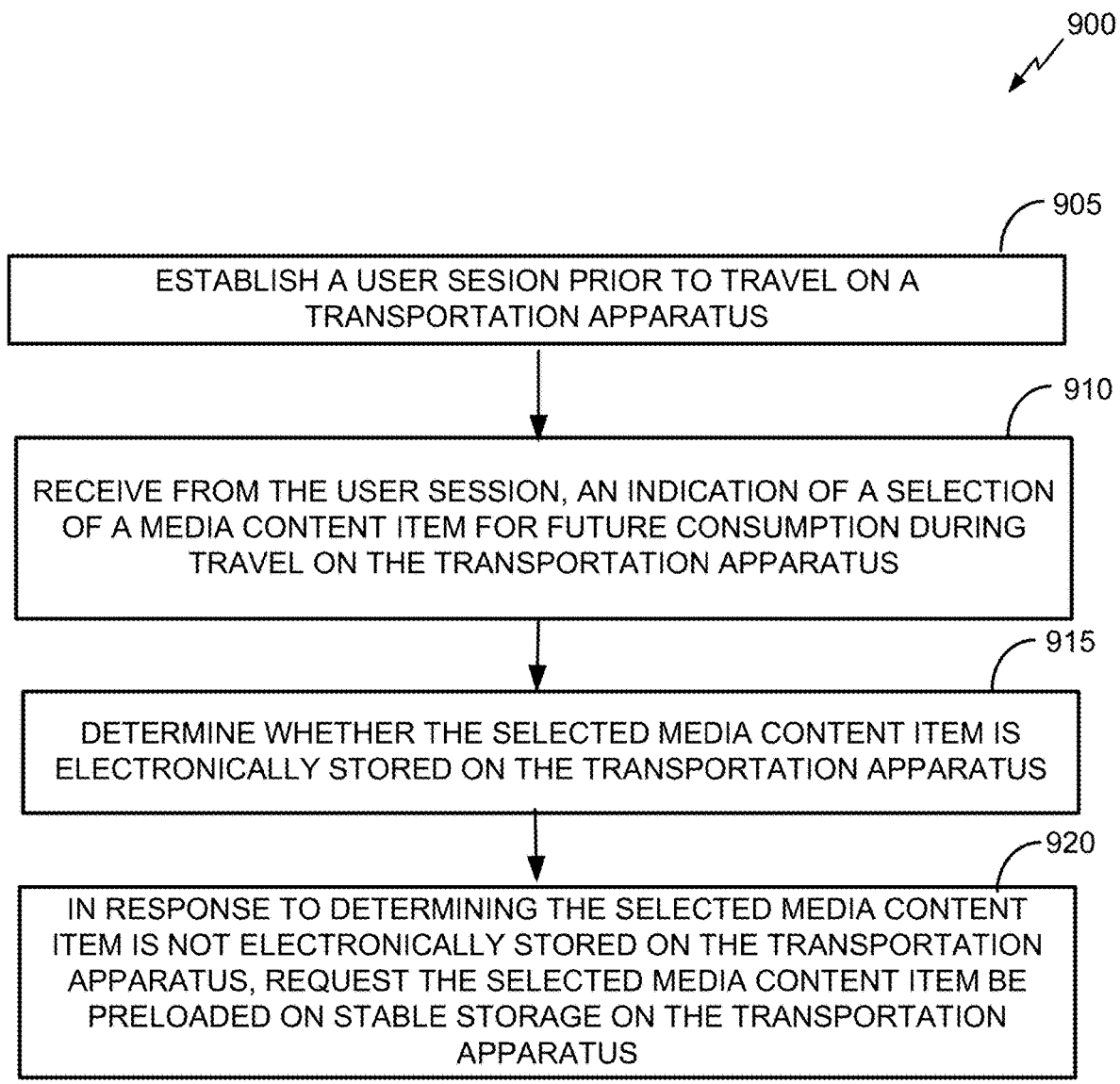
FIG. 9 is a flowchart of a method of transferring selected media to a stable storage on a transportation apparatus.

FIG. 9 is a flowchart of a method of transferring selected media to a stable storage on a transportation apparatus. In some aspects, process 900 may be performed by the media distribution system 148 within the communications system 100 illustrated in FIGS. 1 and 5. For example, in some aspects, the electronic hardware processor 505 of the media distribution system 148 may be configured by instructions stored in a memory, for example, as represented by web server 515 and/or media uploader 520 to perform one or more of the functions described below with respect to process 900.

Process 900 may enable a media distribution system to preload one or more media content items on a transportation apparatus before those media content items are requested by a passenger. Because the media content items are locally stored on the transportation apparatus due to the preloading, delivering these media content items to the passenger may be may also be more cost effective than if the media content items had been provided to the passenger from an off-board stable storage in real-time. For example, in some aspects, the preloading of the media content items before the travel may be performed using network capabilities that are more efficient than network capabilities used to deliver the media content items to the passenger in real-time from an off-board data store when the passenger requests them while traveling. For example, in some aspects, the preloading may be performed using a "trickle" data transfer capabilities, that utilizes unused capacity of a wireless network after all other data has been sent (i.e. when that capacity would otherwise be idle). However, when a passenger requests a media content item, and that media content item must be retrieved from an off-board resource in real time, the data transfer cannot use the "trickle" capability, because the transfer time will be appreciably slower than a "nominal" transfer priority, and would prevent an acceptable user experience from being provided. Therefore, if the request must be satisfied by an off-board storage, the request will compete with other data transfer needs for available bandwidth, and therefore is provided at a relatively higher resource cost per byte transferred.

In block 905, a user session is established prior to travel on a transportation apparatus. In some aspects, establishing a user session may include receiving one or more network messages indicating user authentication information, such as a user name and password. Establishing the user session may also include comparing the received authentication information against authentication data stored in a database, such as the user registration database 850 discussed above with respect to FIG. 8, and establishing the user session if the received authentication information matches the stored authentication information. In some aspects, the user session may be established without any involvement of network equipment installed on the transportation apparatus. For example, the user session may be established via a connection from the user's electronic device 110 to the device authentication system 146 or media distribution system 148 via the network 122 as shown in FIG. 1, without, for example, the use of the 2-way communication system 112, also discussed with respect to FIG. 1.

In block 910, an indication of a selection of a media content item is received. The selection indication may be received, for example, from the user 105's electronic device 110 over the network 122 in some aspects. The indication may take the form of a network message, encoding indication of the selection. The indication may be received, for example, by the media distribution system 148, again without the involvement of the 2-way communications system 112. For example, in some aspects, neither the user 105 nor their electronic device 110 is located on the transportation apparatus when the media content item is selected. Instead, block 910 may be performed substantially before the user enters the transportation apparatus 150, such as one month before, one week before, one day before, one hour before or even one minute before. Receiving the indication may include, for example, receiving a network message from the electronic device 110 indicating the selection and sending an acknowledgment message to the electronic device 110 indicating the network message was received.

Block 915 determines whether the selected media content item is electronically stored on the transportation apparatus. In some aspects, this may include obtaining an identifier for the transportation apparatus, and searching the transportation apparatus inventory database 530 discussed above with respect to FIG. 5 and FIG. 8 based on the identifier to identify whether the selected media content item is stored on the transportation apparatus.

In block 920, in response to determining the selected media content item is not electronically stored on the transportation apparatus; a request to preload the selected media content item on stable storage of the transportation apparatus is made. In some aspects, requesting preloading of the selected media content item may include initiating and/or completing a transfer of the selected media content item from the media distribution system 148 (or from the media content item servers 155) to the media retrieval system 140. For example, in some aspects, the transfer may copy the selected media content item from the media content item servers 155 off-board the transportation apparatus 150 to the media database 141 on board the transportation apparatus 150.

In some aspects, transferring may include initiating a file transfer protocol (ftp) transfer from the media distribution system 148 to the media retrieval system 140. In some aspects, requesting the preload may include transmitting a network request message from the media distribution system 148 to the media retrieval system 140, indicating the selected media content item should be uploaded. The media retrieval system 140 may then initiate a "fetch" or transfer of the identified media content item from the media content item servers 155. For example, in some aspects, the media retrieval system 140 may perform an http "get" operation to obtain the selected media content item from the media content item servers 155. In some aspects, this http "get" operation may be performed via the processor 605 when the fetch is initiated by the media retrieval system 140. In some aspects, the fetch operation from the media retrieval system 140 to the media content item servers 155 may be performed independent of the processor 605.

Some aspects of block 920 include determining the selected media content item is already electronically stored on the transportation apparatus, and therefore block 920 may determine not to request that the selected media content item be preloaded on the stable storage. For example, in some aspects, block 920 may search the inventory database 530, discussed above with respect to FIG. 8, to determine whether the transportation apparatus associated with the travel already includes a copy of the selected media content items. If a copy of the selected media content item is already present on the transportation apparatus, no request to preload the selected media content item may be made in block 920.

Some aspects of block 920 may determine an appropriate resolution of the selected media content item, and request that the media content item be preloaded at the appropriate resolution. The appropriate resolution may be determined, in some aspects, based on one or more characteristics of the user's device 110 or another user device the user may identify manually via a user interface of the application 107 (e.g., through a drop down menu) as being the device that will be used to consume the selected media content item during travel. For example, in some aspects, the resolution may be based on one or more of a screen size of the device, or a form factor of the device. For example, in some aspects, larger screen sizes may require higher appropriate resolutions of selected media content items. In some aspects, the form factor of the device may suggest an appropriate resolution. The form factor of the device may include, for example, whether the device is a smart phone, a laptop, a tablet, or another form factor. In some aspects, a smart phone form factor of the device 110 may indicate a lower resolution than a laptop form factor. In some aspects, the application 107 may be configured to obtain the form factor and/or screen size of the electronic device 107 and communicate this information to the media distribution system 148, which then requests the preloading of the media content item based on the information.

In some aspects, the application 107 may allow the user 105 to enter the appropriate resolution manually, for example, via a user interface of the application 107. In some aspects, this manual entry of the appropriate resolution may override the more automatic selection of the appropriate resolution discussed above based on the screen size and/or device form factor.

Figure 10:
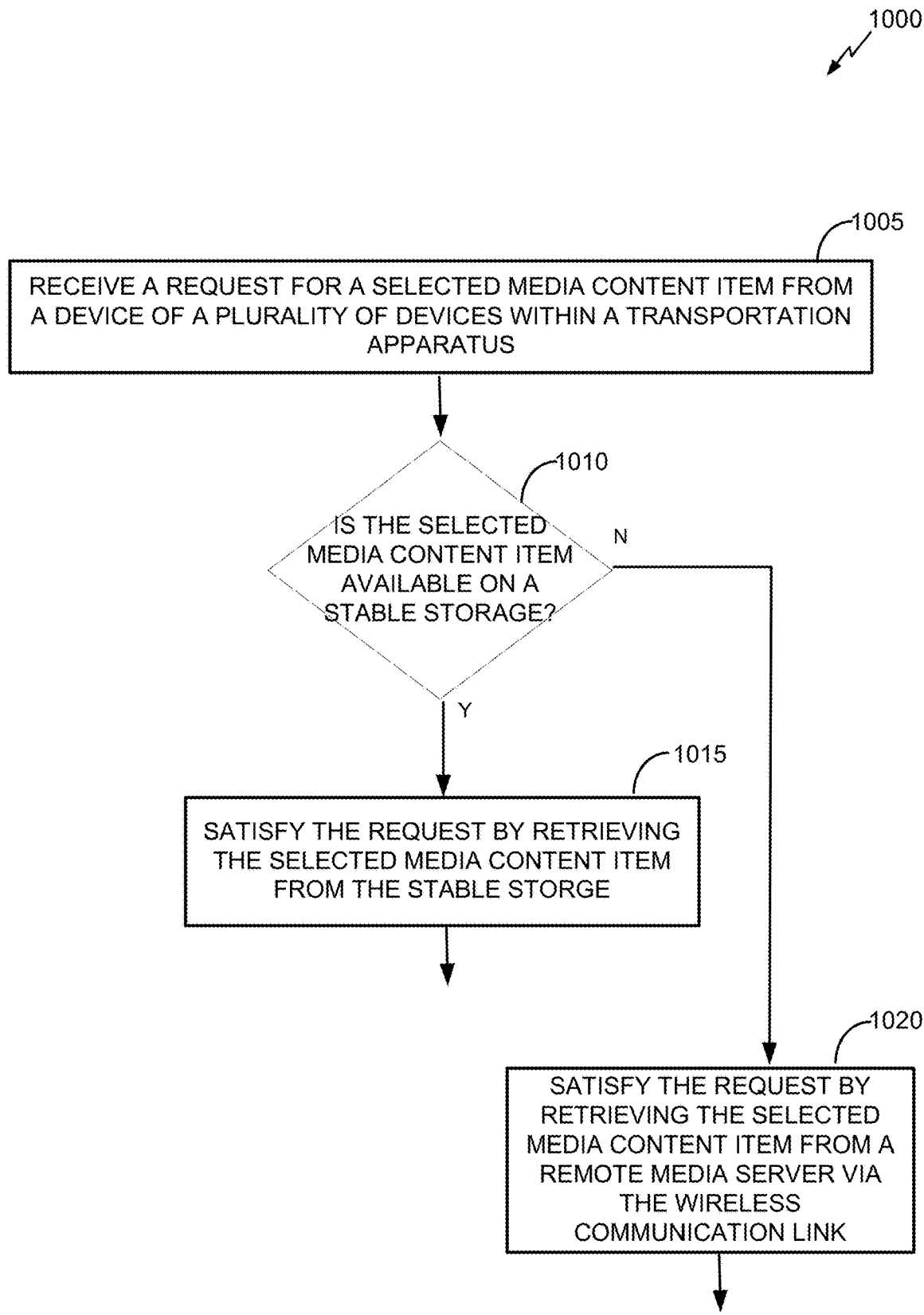
FIG. 10 is a flowchart of a method of receiving a selected media content item and storing the media content item to a stable storage.

FIG. 10 is a flowchart of a method of receiving a selected media content item and storing the media content item to a stable storage. In some aspects, process 1000 may be performed by a media retrieval system 140 within the communications system 100 illustrated in FIGS. 1 and 6. For example, in some aspects, the electronic hardware processor 605 of the media retrieval system 140 may be configured by instructions stored in a memory, for example, as represented by media receiver 615 and media provider 620 to perform one or more of the functions described below with respect to process 1000. In some aspects, the process 1000 may be performed after the process 900, discussed above with respect to FIG. 9. For example, the selected media content item discussed with respect to FIGS. 9 and 10 may be the same.

In block 1005, a request is received for a selected media content item from a device of a plurality of devices within a transportation apparatus. For example, as discussed with respect to FIG. 1, in some aspects, one of the devices 120*a-n* may request a media content item, directly or indirectly, from the media retrieval system 140 within the transportation apparatus 150. Similarly, as discussed with respect to FIG. 4, once the user 105 is on-board the transportation apparatus 150, their electronic device 110 (or 120 now that it is onboard the transportation apparatus 150) may automatically select the media content item, causing the request to be received.

Decision block 1010 determines whether the selected media content item is available on a stable storage within the transportation apparatus. For example, in some aspects, block 1010 may determine whether the selected media content item is available on the media database 141, which is contained within the transportation apparatus 150. In some aspects, determining whether the selected media content item is available may include identifying a name or other unique identifier of the selected media content item. For example, in some aspects, the name may be obtained from a uniform resource locator transmitted from the requesting device 120 to the media retrieval system 140. After the name is identified, the media database 141 may be searched for a record indicating the identified name. If a match is found, the selected media content item is available from the media database 141 (stable storage), otherwise, the selected media content item is not available in some aspects.

If the selected media content item is not available, process 1000 moves from decision block 1010 to block 1020, which satisfies the request by retrieving the selected media content item from a remote media server via a wireless communications link. For example, in some aspects, block 1025 may be implemented by instructions in the media provider 620 that configure the processor 605 to request the selected media content item via the two way communications system 112 from the streaming media servers 155, via the network 122, discussed above with respect to FIG. 1.

If the selected media content item is available on the stable storage, process 1000 moves from decision block 1010 to block 1015, which satisfies the request by retrieving the selected media content item from the stable storage. For example, in some aspects, retrieving the selected media content item from the stable storage may include requesting the selected media content item from the stable storage, and receiving the requested media content item from the stable storage. The requested media content item may then be provided to the user 105, for example, via their electronic device 110/120.

Figure 11:
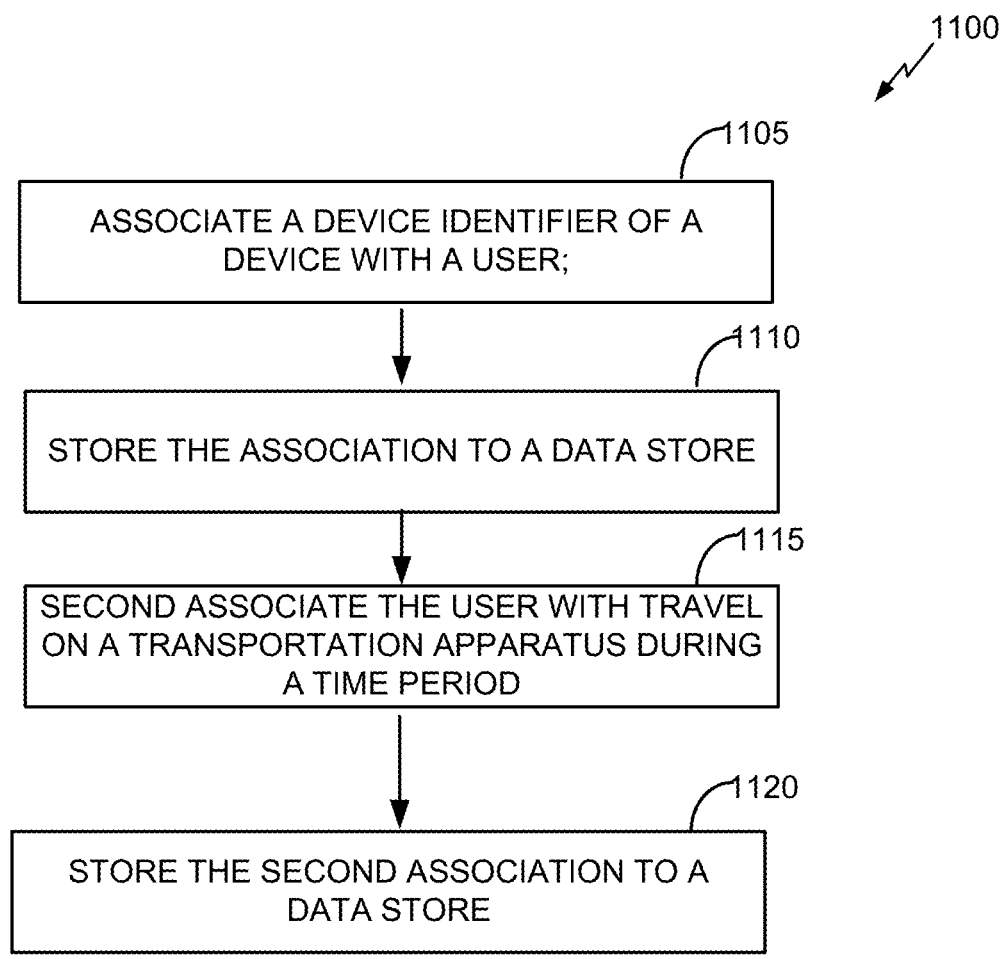
FIG. 11 is a flowchart of a method for storing an association between a device, a user, and travel on a transportation apparatus.

FIG. 11 is a flowchart of a method for storing an association between a device, a user, and travel on a transportation apparatus. In some aspects, the process 1100 may be performed by the device authentication system 146 described above with respect to FIGS. 1 and 4. For example, in some aspects, instructions stored in one or more of the device/user association generator 715 and user/travel association generator 720 may configure the processor 705 to perform one or more of the functions discussed below with respect to process 1100.

Process 1100 may allow an association to be performed between a user and one or more devices the user typically may utilize to access wireless communication services provided during travel on a transportation apparatus. An association between the user and a particular travel on a particular transportation apparatus may also be formed by process 1100. By forming these associations, enhanced ease of use may be provided to the user at the time they participate in the travel. For example, upon entering the transportation apparatus, the association between their device and the user may already be known. Thus, a system providing wireless communications services may be able to identify the user without necessarily prompting the user to enter user identifying information, such as user name and password information. Furthermore, as process 1100 may have previously formed an association between the user and the particular travel on the transportation apparatus at the present time, the system may have an additional level of assurance that any requests for wireless communication services initiated by the user's device are legitimate, and may be granted without requiring additional authentication credentials from the user. This may provide for enhanced ease of use for the device user, when initiating wireless communication services within the transportation apparatus.

In block 1105, a device identifier is associated with a user. For example, in some aspects, a device identifier may include one or more of a LAN or Wi-Fi station address, Internet Protocol address, a Globally Unique Identifier (GUID), or other identifier. In some aspects, block 1105 may include establishing a session with the user 105 through the use of authentication parameters such as a user name and password. Once the session is established, the device identifier for the device 110 shown in FIG. 1, which may have been used to establish the session, is obtained. For example, in some aspects, the application 107 running on the device 110 may obtain the device identifier via an operating system API of the device 110 and communicate the device identifier to media distribution system 148 discussed above with respect to FIG. 1. The association may then be made by the media distribution system 148 between the device identifier and the user that established the session.

In block 1110, the association may be stored in a data store. In some aspects, the data store may be a database system, such as the database 147 discussed above with respect to FIG. 1, and in some aspects, the device association table 806 discussed above with respect to FIG. 8. As discussed above, in some aspects, the device authentication database 147 may be at least partially synchronized with the provisioning database 635 installed within the transportation apparatus. For example, the device association table 806 may be synchronized so as to be included in both the provisioning database 635 and the device authentication database 147.

In block 1115, a second association is created. This second association may be generated when the user schedules or books travel on a transportation apparatus. In some aspects, the association associates the user with the transportation apparatus, and also with a period of time when the travel may occur. In some aspects the period of time may extend from a first time before the start of the travel to a second time after the end of the travel, to accommodate changes to travel schedules due to delays and the like. For example, in an embodiment including travel of a two hour airline flight, the period of time may be, in various aspects, 2, 2.5, 3, 3.5, 4, 4.5, 5, 5.5, or 6 hours in various embodiments.

In block 1120, the second association is also stored to a data store. In some aspects, the data store referenced in blocks 1110 and 1120 are the same data store, while in other aspects, they may be different data stores. The second association may be stored as part of the device association table 806, the transportation apparatus table 808, and the travel table 810. In some aspects, the stored association of block 1120 may be utilized by the process 1200, discussed below, to determine whether a device may be provided authorization to utilize a network without obtaining authentication credentials (such as a user name and password) from the device.

Figure 12:
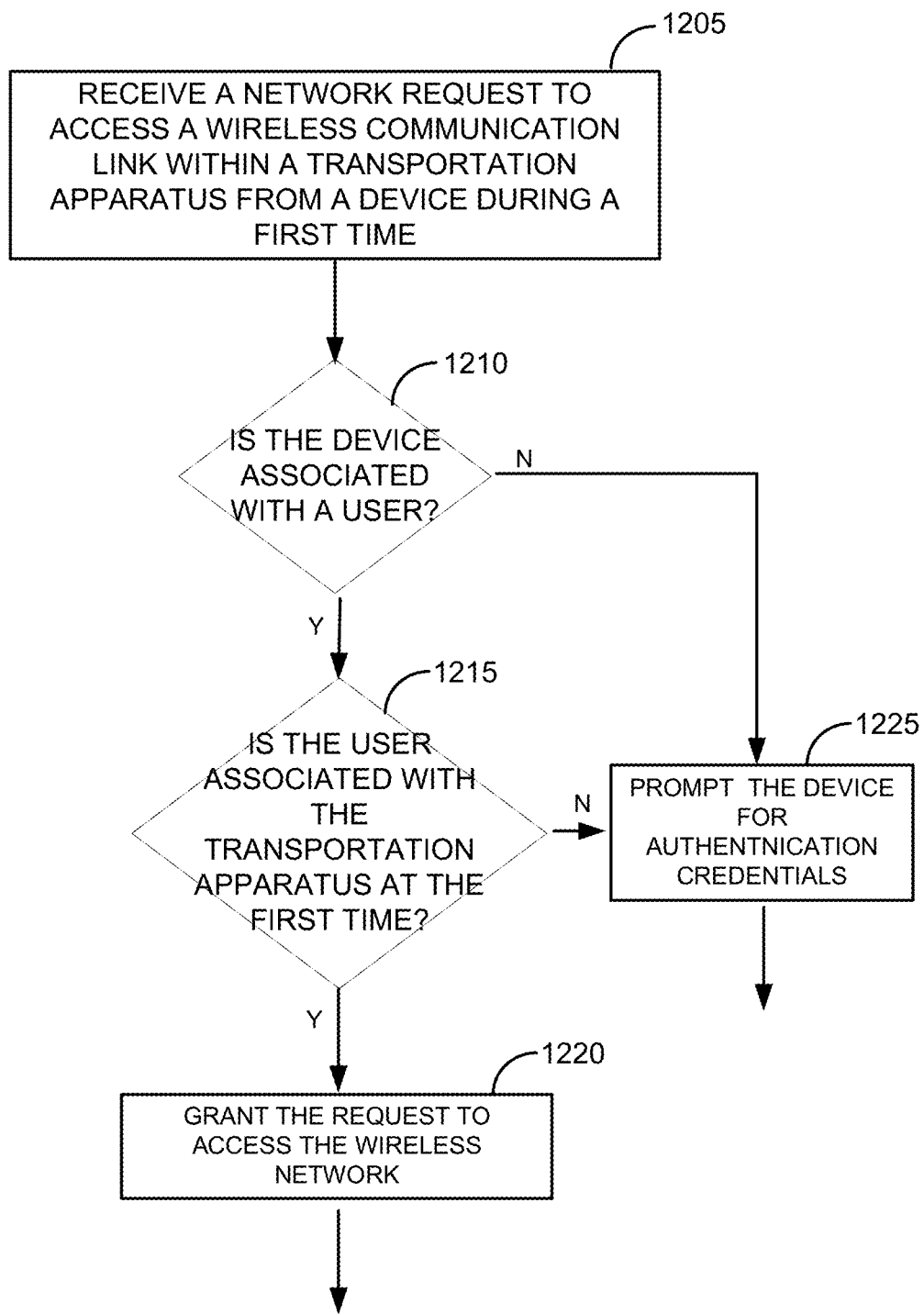
FIG. 12 is a flowchart of authorizing wireless access for a device.

FIG. 12 is a flowchart of authorizing wireless communication services for a device. In some aspects, the process 1200 shown in FIG. 12 may be performed by the media retrieval system 140, illustrated above with respect to FIGS. 1 and/or 6. For example, in some aspects, instructions in the device authenticator 630 may configure the processor 605 to perform one or more of the functions discussed below with respect to process 1200.

As discussed above, in some aspects, a user experience may be enhanced during travel on a transportation apparatus by establishing an association between the user and their electronic device(s) before the travel occurs. Because this association is previously established, upon entering the transportation apparatus and requesting wireless communication services, there may be a reduced burden on the user to authenticate themselves onto the wireless communications network. For example, there may not be a need to prompt the user for identifying information such as a user name and/or password.

In block 1205, a network request to access a wireless communication link on a transportation apparatus is received from a device. The request is received at a first time. In some aspects, the network request includes an identifier of the device. For example, in some aspects, the request may include a WiFi or LAN station address identifying the address. In some aspects, the request may include a different identifier of the device, for example a GUID, IP address, or other identifier.

Decision block 1210 determines if the device is associated with a user. In some aspects, block 1210 includes searching a data store for a device identifier associated with the device. The data store may store associations between device identifiers and users. For example, block 1210 may search the provisioning database 635. In some aspects, one or more of the device association table 806, transportation apparatus table 808, and travel table 810, discussed above with respect to FIG. 8, may be synchronized between the device authentication database 147 and the provisioning database 635 such that the media retrieval system 140 on-board a transportation apparatus has ready access to the associations stored therein. If no association between the device and a user is found, process 1200 moves to block 1225, which may prompt the device for authentication credentials, such as a user name and password.

If an association between the device and a user is identified in block 1210, then block 1215 determines whether the user is associated with travel on the transportation apparatus during the first time. In some aspects, block 1215 may include searching a database for the user, and determining if the user is associated with the transportation apparatus. For example, the travel table 810 may be searched to determine if the travel associated with the transportation apparatus at the first time is associated with a user that is associated with the received device identifier via the device association table 806.

If such an association is found, the association may include a time range, for example, as shown by field 810*b* of travel table 810. Block 1215 may determine whether the first time is included within the time range. If the first time is within the time range, then process 1200 moves to block 1220, which grants the request to access the wireless network on the transportation apparatus to the device. Granting the request may include providing the device with access credentials and/or security key information to enable the device to access (transmit and/or receive data on) the wireless network on the transportation apparatus. Granting the request may also include setting an indication within a router or other controller device of the wireless network to allow and/or enable the device to transmit and/or receive data through the wireless network.

If the user is not associated with the transportation apparatus at the first time, then process 1200 moves to block 1225, which prompts the device for authentication credentials. In some aspects, prompting the device for authentication credentials may include sending data to the device defining a user interface that includes at least two edit boxes, one edit box for a username parameter and one edit box for a password parameter. Prompting the device for authentication credentials may also include receiving a network message from the device indicating values for the username and password parameters.

Some aspects of block 1225 may not prompt the device for authentication credentials as shown, but may instead deny the request for access to the wireless network. Denying the request may include transmitting a data message, such as a response to an http get request from the device, the data message including a text string indicating that the request has been denied. In some aspects, denying the request may also include transmitting a transmission control protocol reset packet to the device.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-e, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, the functional means may include a processor and memory operably coupled to the processor, the memory storing instructions that configure to the processor to perform the described functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a data communications medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of data communications medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A network service system for a transportation apparatus, comprising:
   a device authentication system, comprising:
   a first electronic hardware processor, configured to:
   associate a device identifier of a device with a user scheduled to travel on the transportation apparatus; and
   a two-way communication system installed within the transportation apparatus, comprising:
   a network access terminal to provide network access to the transportation apparatus via a wireless communication link; and
   a second electronic hardware processor, configured to:
   associate the user with travel on the transportation apparatus for a time period, wherein the time period is associated with travel on the transportation apparatus and extends from a first time before a start of the travel to a second time after an end of the travel;
   receive, from the device at a third time, a network request to access the wireless communication link, the network request comprising the device identifier; and
   in response to receiving the network request:
   determine the association between the user and the device identifier;
   associate the network request with the user based at least in part on the association between the user and the device identifier; and
   in response to associating the network request with the user, satisfy the network request of the device.

2. The network service system of claim 1, wherein the time period associated with travel on the transportation apparatus further comprises a time delay before when the user is scheduled to travel on the transportation apparatus and after the user is scheduled to complete the travel on the transportation apparatus.

3. The network service system of claim 1, wherein the second electronic hardware processor is further configured to:
   determine that the third time is within the time period, wherein satisfying the network request of the device is based at least in part on the third time being within the time period.

4. The network service system of claim 1, wherein the second electronic hardware processor is further configured to:
   receive, from the first electronic hardware processor, a travel table comprising a field that indicates a time range for the time period for associating the user with travel on the transportation apparatus, wherein satisfying the network request of the device is based at least in part on the third time being within the time range.

5. The network service system of claim 1, wherein the device identifier is a station address, a media access control address, or a Globally Unique Identifier (GUID) of the device.

6. The network service system of claim 1, wherein satisfying the network request of the device comprises providing the device with access credentials or key information for accessing the wireless communication link.

7. The network service system of claim 1, wherein the second electronic hardware processor is further configured to:
   detect the device within the transportation apparatus at the third time or prior to the third time; and
   authenticate the device for the access without requiring a username or password based at least in part on the association between the user and the travel on the transportation apparatus for the time period.

8. The network service system of claim 1, wherein the second electronic hardware processor is further configured to:
   prompt the device for authentication credentials in response to receiving the network request.

9. The network service system of claim 1, wherein the second electronic hardware processor is further configured to:

receive authentication credentials, wherein determining the association between the user and the device identifier is further based at least in part on receiving the authentication credentials.

10. The network service system of claim 1, wherein the second electronic hardware processor, in response to receiving the network request, is further configured to:
associate the device with user credentials the user utilized to authenticate the device with an application to schedule the travel on the transportation apparatus.

11. A method of pre-authenticating a device of a user, comprising:
associating a device identifier of the device with the user, wherein the user is scheduled to travel on a transportation apparatus;
associating the user with travel on the transportation apparatus for a time period, wherein the time period is associated with travel on the transportation apparatus and extends from a first time before a start of the travel to a second time after an end of the travel;
receiving, from the device at a third time, a network request to access a wireless communication link within the transportation apparatus, the network request including the device identifier; and
in response to receiving the network request:
determining the association between the user and the device identifier;
associating the network request with the user based at least in part on the association between the user and the device identifier; and
in response to associating the network request with the user, satisfying the network request of the device.

12. The method of claim 11, wherein the time period associated with travel on the transportation apparatus comprises a time delay before when the user is scheduled to travel on the transportation apparatus and after the user is scheduled to complete the travel on the transportation apparatus.

13. The method of claim 11, further comprising:
determining that the third time is within the time period, wherein satisfying the network request of the device is based at least in part on the third time being within the time period.

14. The method of claim 11, further comprising:
receiving information associated with a travel time field of a travel table, wherein the information identifies a time range for an association of the device with the transportation apparatus.

15. The method of claim 11, wherein the device identifier is a station address, a media access control address, or a Globally Unique Identifier (GUID) of the device.

16. The method of claim 11, wherein satisfying the network request of the device further comprises:
providing the device with access credentials or key information for accessing the wireless communication link.

17. The method of claim 11, further comprising:
detecting the device within the transportation apparatus at the third time or prior to the third time; and
authenticating the device for the access without requiring a username or password based at least in part on the association between the user and the travel on the transportation apparatus for the time period.

18. The method of claim 11, further comprising:
prompting the device for authentication credentials in response to receiving the network request.

19. The method of claim 11, further comprising:
receiving authentication credentials, wherein determining the association between the user and the device identifier is further based at least in part on receiving the authentication credentials.

20. The method of claim 11, further comprising:
associating the device with user credentials the user utilized to authenticate the device with an application to schedule the travel on the transportation apparatus.

* * * * *